United States Patent [19]
Wrobel et al.

[11] Patent Number: 5,894,371
[45] Date of Patent: Apr. 13, 1999

[54] FOCUS MECHANISM FOR VARIFOCAL LENS

[75] Inventors: Leslie P. Wrobel, Montreal, Canada; Jerrold Zimmerman, Randolph, Mass.; Kenneth M. Kunz, Pointe Claire, Canada

[73] Assignee: AlliedSignal, Inc., Morristown, N.J.

[21] Appl. No.: 08/870,628

[22] Filed: Jun. 6, 1997

[51] Int. Cl.[6] .................................................. G02B 7/02
[52] U.S. Cl. ........................ 359/823; 359/824; 399/200; 355/57
[58] Field of Search .............................. 359/823, 824, 359/694; 362/293, 294; 355/57, 58; 399/200

[56] References Cited

U.S. PATENT DOCUMENTS

| | | | |
|---|---|---|---|
| 4,209,248 | 6/1980 | Gibson et al. | 399/200 |
| 5,042,914 | 8/1991 | Hulderman et al. | 359/824 |
| 5,212,595 | 5/1993 | Dennison, Jr. et al. | 359/823 |
| 5,646,790 | 7/1997 | Kohmoto et al. | 359/823 |
| 5,691,854 | 11/1997 | Yoshida et al. | 359/823 |

*Primary Examiner*—Loha Ben
*Attorney, Agent, or Firm*—Larry J. Palguta

[57] ABSTRACT

A device (10) for changing the focus and field of view of an optical device having an optical element (19, 21) which is movable grossly to change field of view and movable incrementally to change focus of the device (10) with either field of view includes an operator actuatable control system for varying incrementally the axial position of this optical element within each of the regions to focus the optical device in each field of view mode. The device (10) includes a control knob (31), a threaded shaft (33) coupled to the control knob (31), a pair of stop members (37, 39) engaging threadedly the threaded shaft, and a linkage (45, 53, 49, 63, 59, 55, 67, 69) for converting axial motion of a stop member along the threaded shaft to incremental movement of the movable optical element along the primary optical axis (29). The threaded shaft (33) has a right hand thread along a portion of the length thereof engaging threadedly one stop member (39) and a left hand thread along another portion of the length thereof engaging threadedly the other stop member (37) so that the direction or sense of control knob motion necessary to increase the focus distance is the same in each mode.

14 Claims, 7 Drawing Sheets

FOCUS MECHANISM FOR VARIFOCAL LENS

The present invention relates generally to methods and apparatus for changing the focus of an optical device to view near or distant objects and more particularly to focusing methods and apparatus in a variable magnification or variable field of view optical system.

Variable magnification optical devices are commonplace and include the well-known camera "zoom" lens system and variable-power rifle telescopes among others. These illustrative devices are of the continuously variable magnification type. An increase in magnification and accompanying decrease in the field of view is characteristic of such variable magnification systems. Typically these systems move an interior lens assembly along the principal optical axis of the optical device to change magnification while a different lens such as the objective lens or eyepiece lens system is moved axially relative to the remaining optical components to focus the device. Thus, separate mechanical systems are needed to move separate optical components to accomplish the two functions of changing magnification and focusing the system. These systems are known as mechanically compensated zoom lenses.

Variable magnification in discrete steps rather than continuously variable magnification is preferred for some applications. One technique for achieving such discrete magnification changes is to physically remove certain of the intermediate optical components from the optical train and substitute others. Another technique is to simply move an intermediate portion of the optical system, typically a pair of convex (converging) lenses, between, for example, two discrete positions. As in the continuous systems, focusing of the system may be achieved by axial movement of either the objective lens or of the eyepiece relative to the remainder of the optical system. The technique where an intermediate pair of lenses, sometimes called a variator, are moved between two discrete positions allows focusing to be accomplished by moving the same optical components, the variator, as were moved to change the field of view. Moving the same optical components to change magnification and to focus the system is highly desirable as it eliminates mechanical components and economizes on space requirements. However, there is an undesirable aspect. The direction in which the variator must be moved to change focus from a distant object to a closer object when in one magnification mode is opposite the direction in which the variator must be moved to change focus from a distant object to a closer object when in the other magnification mode. This is confusing to users of the optical system.

It is desirable to provide a compact discrete zoom optical system in which changes in magnification and focus changes are achieved by moving the same optical components while avoiding the problem of reversed focus control direction.

The present invention provides solutions to the above problems by providing a variable magnification, variable focus optical device including at least one element which is movable along the primary axis of the device between distinct regions corresponding to higher and lower device magnification modes. This optical element is also movable along the axis within each of the two distinct regions to vary the focus of the device within the corresponding magnification mode. There is one operator control for grossly moving this optical element between the first and second regions to change from one magnification mode to another and a second operator control for incrementally varying the axial position of this optical element within each region to focus the optical device in each magnification mode. This second or focus control is movable in one sense to change the focus from a nearby object to a more distant object in either mode and in the opposite sense to change the focus from a remote object to a closer object in either mode. The present invention comprises a variable magnification, variable focus optical device of the type having a plurality of optical elements disposed along a primary optical axis of the device, the optical elements including at least one optical element movable along the axis between at least two distinct regions, a first region corresponding to a higher optical device magnification mode and a second region corresponding to a lower optical device magnification mode, and said at least one optical element movable along the axis within each of the two distinct regions to vary the focus of the device within the corresponding magnification mode, the improvement comprising:

first operator actuatable means for moving said at least one optical element between said first and second regions to change selectively from one magnification mode to another; and second operator actuatable means for varying axial positioning of said at least one optical element within each said region to focus the optical device in each magnification mode, said second operator actuatable means being movable in one sense to change the focus from a nearby object to a more distant object in either of said regions and in the opposite sense to change the focus from a remote object to a closer object in either of said regions.

Corresponding reference characters indicate corresponding parts throughout the several views of the drawings.

Figure 1:
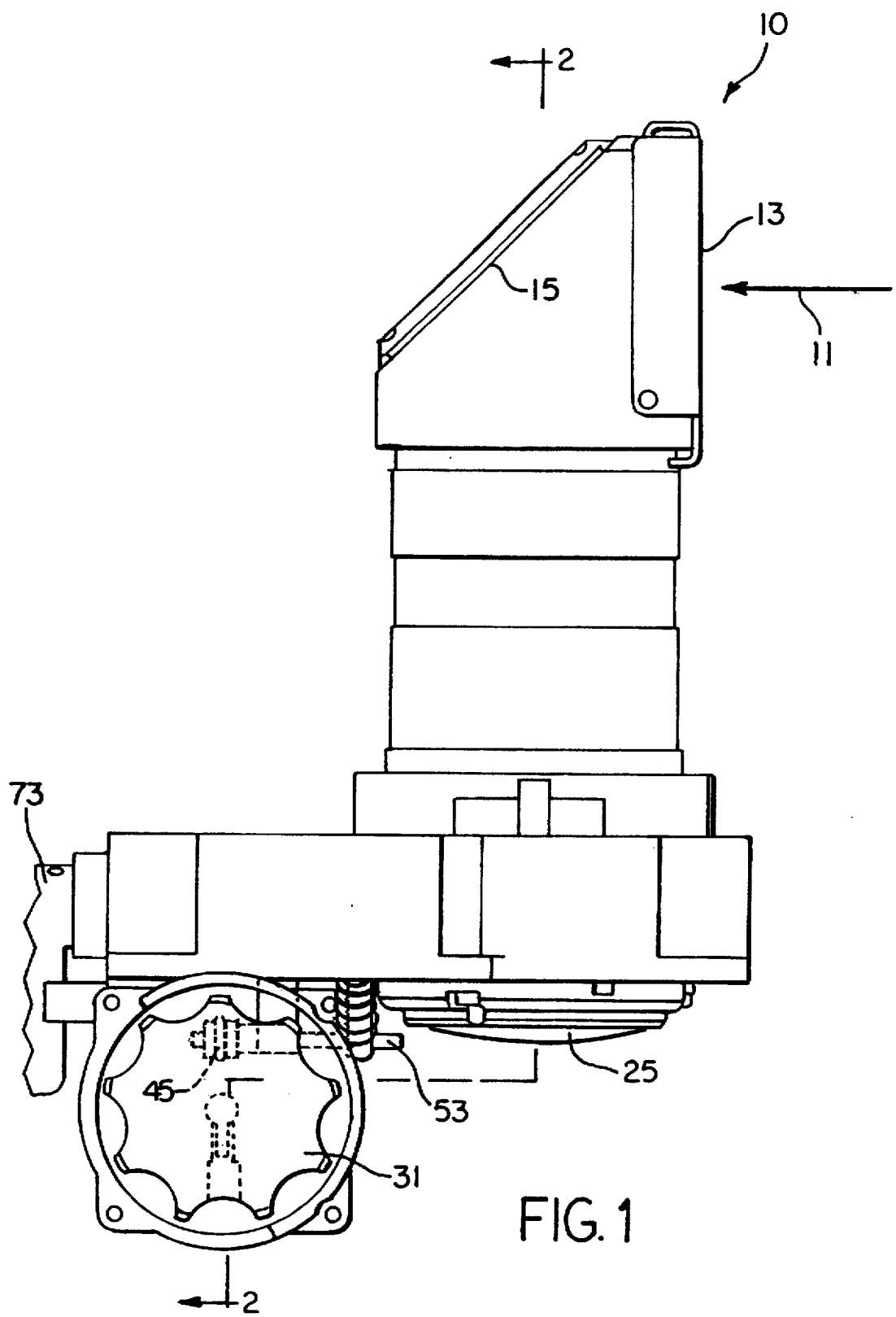
FIG. 1 is a side elevation view partly in cross-section of a periscopic optical device set for wide field of view operation illustrating the present invention in one form.

In FIG. 1, incoming light from a distant object is illustrated by the arrow 11 in optical device 10. This light passes through a window 13 and is reflected by a mirror 15 downwardly through a series of lenses better seen in FIG. 2. The light passes through an objective lens 17, through a pair of lenses 19 and 21, and finally through the lenses 23 and 25. The last mentioned lenses may be considered an "eyepiece" and the light eminating therefrom could form a directly viewable image, be projected onto a screen, or otherwise utilized. In the preferred form, the device operates in the infrared range of the spectrum and the light eminating from lens 25 is not further viewable and must be further processed by structure located beneath that shown before a viewable image of the object is available.

Figure 2:
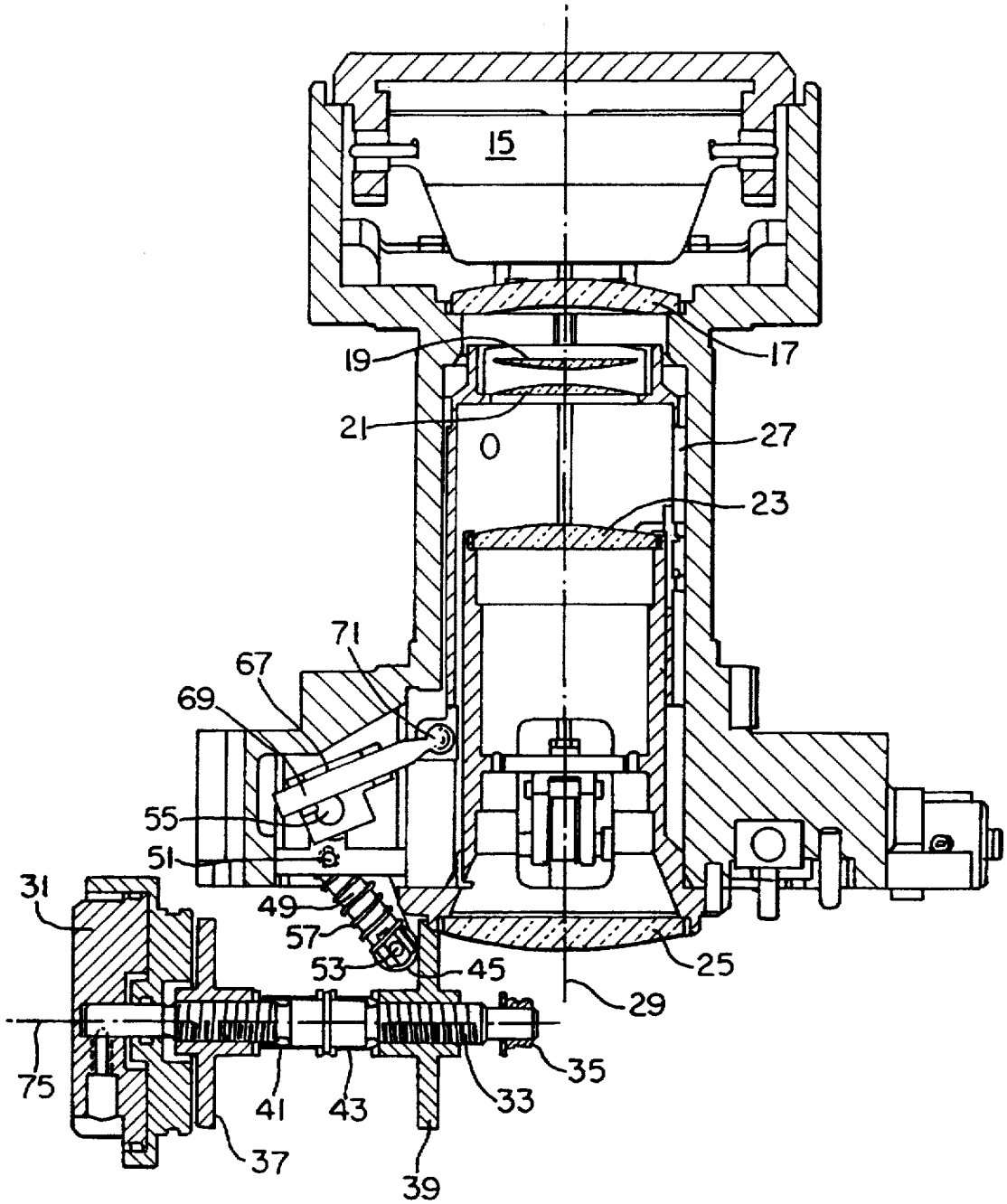
FIG. 2 is a view in cross-section along lines 2—2 of FIG. 1.
Figure 4:
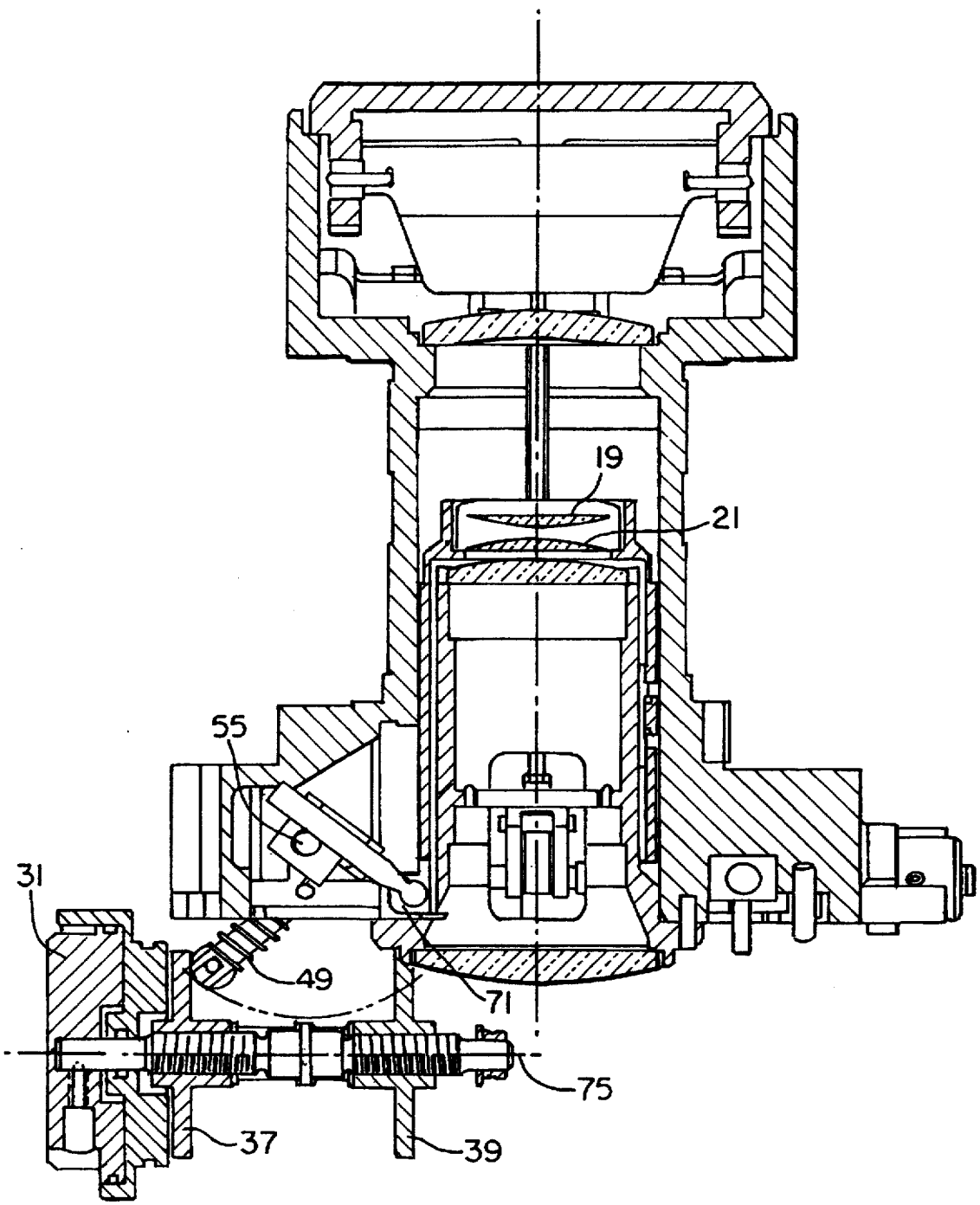
FIG. 4 is a view similar to FIG. 2, but illustrating the device in the narrow field of view configuration and focused at maximum distance.
Figure 5:
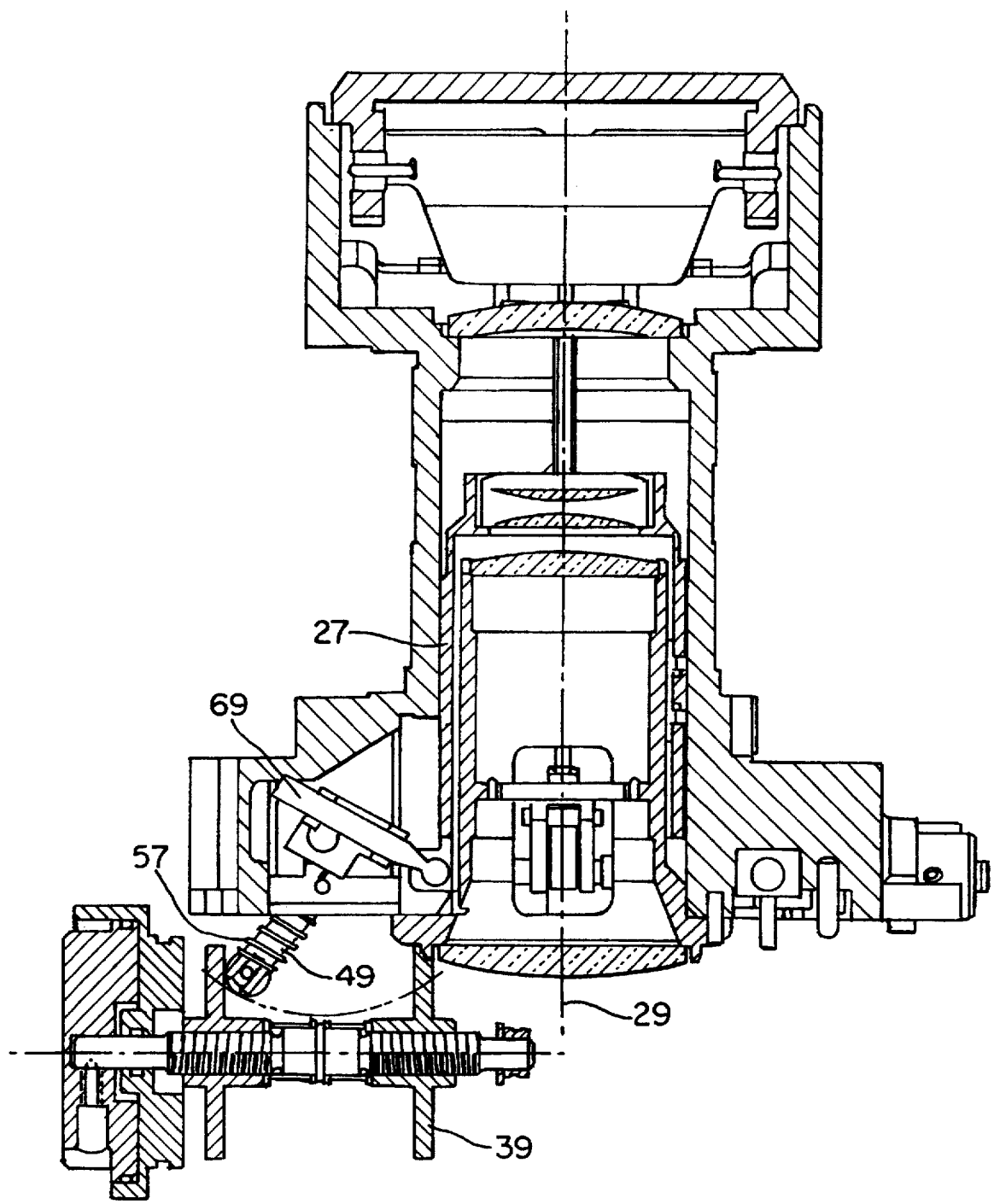
FIG. 5 is a view similar to FIGS. 2 and 4, but illustrating the device in the narrow field of view configuration and focused at a midrange distance.

The pair of lenses 19 and 21 are mounted in a sleeve 27 which is reciprocable along the principal optical axis 29 of the device. This lens pair is grossly movable to function as a zoom lens or variator to change the magnification (hence also the field of view) of the device. FIG. 2 shows the variator in an upper position for a wide field of view and low magnification. FIGS. 4 and 5 show the variator in a lower position for greater magnification and a more narrow field of view. The lens pair 19, 21 is also finely movable to selectively focus the optical device on close or on more distant objects. FIG. 4 shows the variator in a location where the device is focused at maximum distance. This variator location is identified as 30 in FIG. 7 while the maximum focus distance is indicated at 38. FIG. 5 shows the variator moved upwardly somewhat to a midrange location 34 of FIG. 7 to focus the device on a closer object.

It would be possible to provide an operator actuatable direct drive for the sleeve 27 and its variator lens pair 19, 21, for example, by a simple rack and pinion drive, so that an operator could rotate a control knob to move sleeve 27 along the axis 29. Such an arrangement has several significant drawbacks as best understood by reference to FIG. 7.

Figure 7:
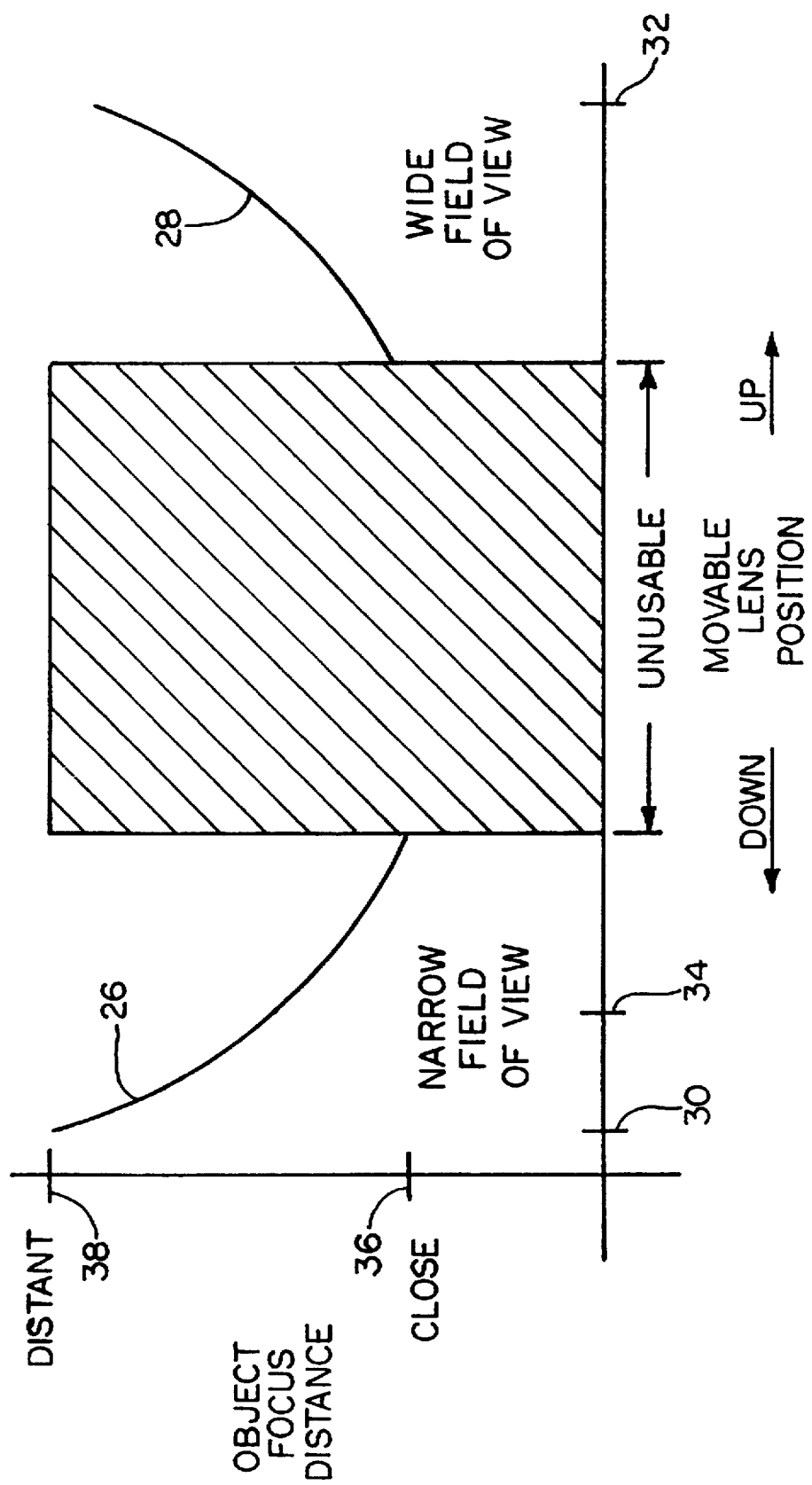
FIG. 7 is a graphical illustration of the interrelationship between movable lens position and distance at which the device of FIGS. 1-5 is focused.

In FIG. 7, the curve 26 illustrates the relationship between variator or movable lens position and the distance at which the optical device is focused when in the narrow field of view configuration. The curve 28 illustrates the relationship between variator or movable lens position and the distance at which the optical device is focused when in the wide field of view configuration. When the variator is in the lower or narrow field of view position, upward movement of the variator corresponding, for example, to clockwise movement of the control knob, changes the focus from a more distant object toward a closer object. When the variator is in the upper or wide field of view position, upward movement of the variator, again corresponding to clockwise movement of the control knob, changes the focus from a closer object toward a more distant object. The extreme lowermost variator position 30 corresponds to the most distant focus and the extreme uppermost variator position 32 also corresponds to the most distant focus. Thus, the sense in which the control knob is moved changes when changing between wide and narrow field of view configurations, a result which is most frustrating and confusing to the user.

There is a region identified as "unusable" which is intermediate the narrow and wide field of view variator positions in which the optical device is inoperative. With the suggested rack and pinion drive, significant control knob rotation would be required to drive the variator through this region when transitioning from one field of view region to the other. During this transition, there would be a significant time period during which no view would be available. Further, the focus distance previously set for one of the fields of view would be lost when transitioning from one field of view region to the other.

Figure 3:
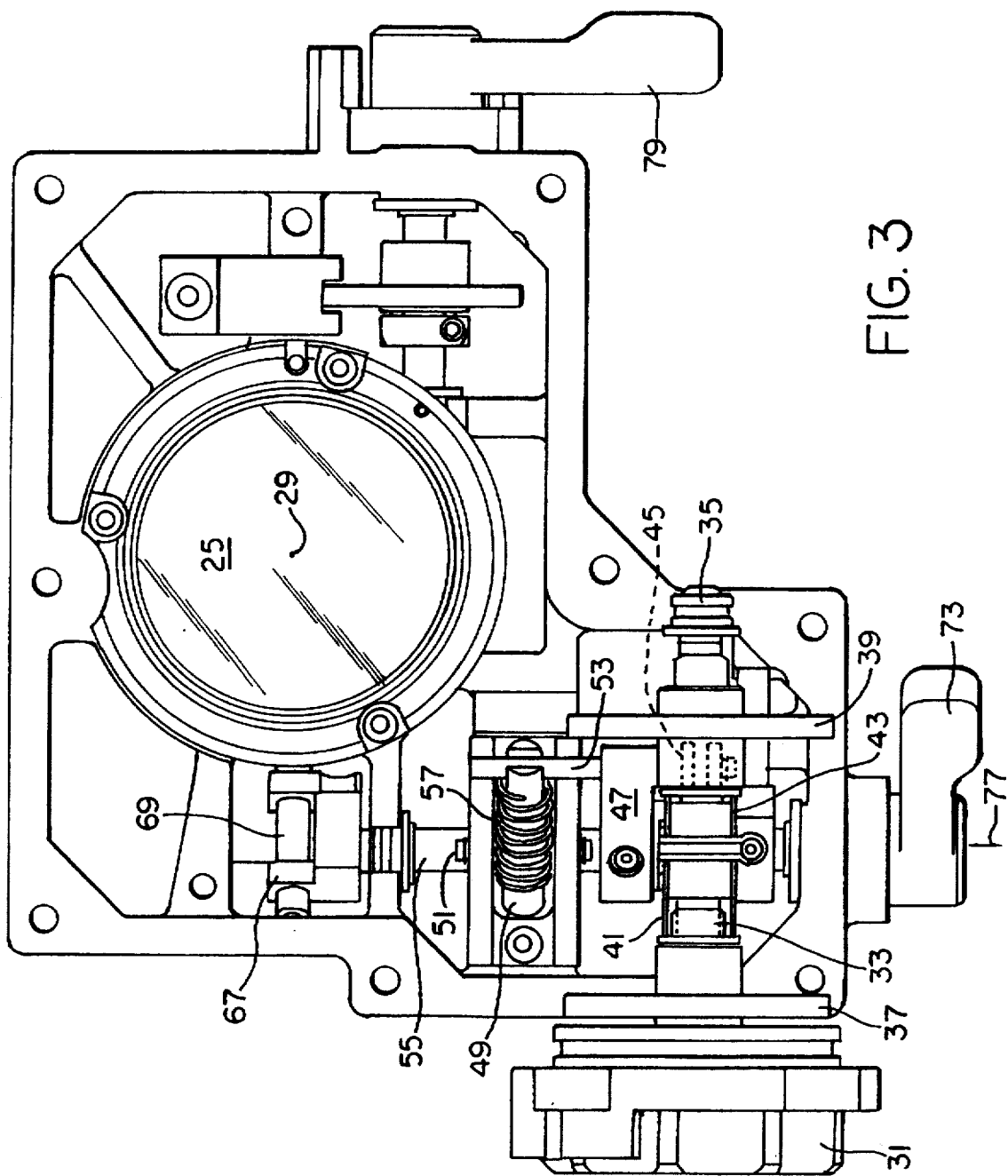
FIG. 3 is a bottom view of the device of FIGS. 1 and 2.

Referring now primarily to FIGS. 2 and 3, these drawbacks are eliminated in the present invention by providing an operator rotatable focusing knob 31 and affixed focus shaft 33 suitably supported by bearings such as bushing 35 for rotation about shaft axis 75. Shaft 33 threadedly engages a pair of disk-shaped focus ring stops 37 and 39. A pair of focus ring stop coil springs 41 and 43 urge the focus ring stops 37 and 39 away from one another to effectively eliminate any backlash movement of stops 37 and 39 axially along the shaft 33 which might otherwise be allowed by tolerances between the interior stop threads and the shaft threads. Coil springs 41 and 43 keep focus ring stops 37 and 39 in position during vibration. Also, so long as a stop engages only the shaft 33, there is sufficient frictional coupling between the two that the ring rotates with the shaft, thereby maintaining its axial position despite shaft rotation.

A focus roller 45 engages stop 39 and provides sufficient friction to prevent rotation of stop 39 when the shaft 33 is rotated. Hence, rotation of shaft 33 now causes stop 39 to move back and forth along the threads of shaft 33. Roller 45 is coupled by pin 53 to the magnification/focus control lever or arm 49. Roller 45 and pin 53 are pivotably supported by block 47 for movement between the positions shown in FIG. 2 and those shown in FIGS. 4 and 5. The arm 49 is coupled by the linkage shown in FIGS. 6a–6c to the control shaft 55. Shaft 55 has affixed thereto a support block 67 which slidably supports connecting rod 69. The rod 69 has a ball end which engages a socket 71 on the variator sleeve 27. Thus, rotation of shaft 55 causes vertical motion of the sleeve 27 and its variator lenses 19 and 21 along the primary optical axis of the device.

Figure 6C:
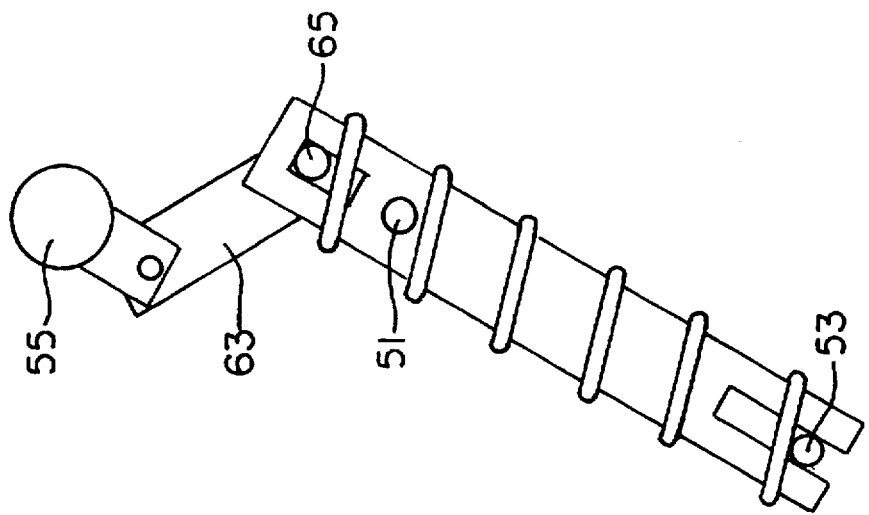
FIGS. 6a-6c are simplified sequential illustrations of the coupling between the magnification/focus control arm and the variator position shaft shifting from the wide field of view to the narrow field of view.
Figure 6B:
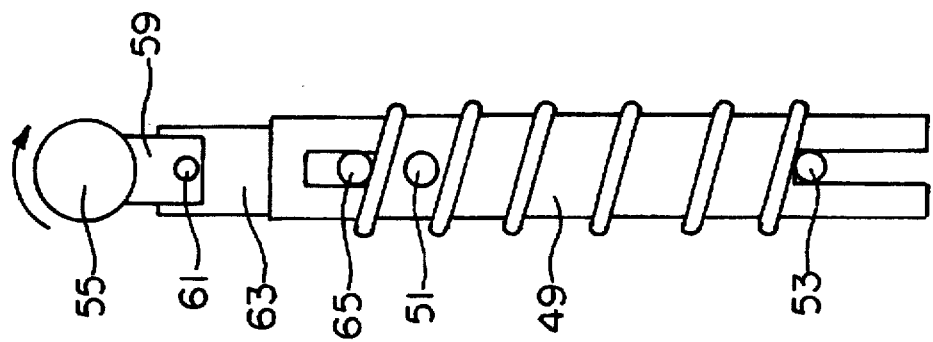
Figure 6A:
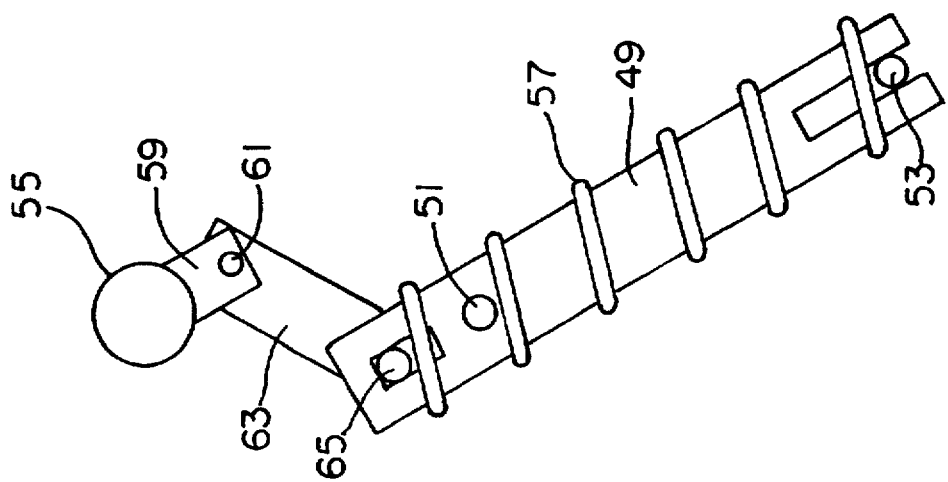

There is an operator actuable control lever 73 (see FIG. 3) fastened to shaft 55 which may be moved to change the device between its wide and narrow field of view states. The operator actuatable lever 79 is used to vary the angle of the mirror 15 somewhat and forms no part of the present invention. Rotation of the control lever 73 about control shaft axis 77 also moves the block 47, thus moving the pin 53, roller 45, and focus control over center mechanism will throw the block 47, pin 53, and roller 45 between the wide field of view position shown in FIG. 2 and the narrow field of view position shown in FIGS. 4 and 5 as best understood by reference to FIGS. 6a–6c. Once the motion of lever 73 is past center axis 77, the roller 45 will automatically hit stop 37 or 39. Shaft 55 is fixed in the frame of the optical device for rotation about its central axis 77. Focus control or lever arm 49 is fixed in the device to pivot about pin 51. To transition from the wide to narrow field of view condition, the operator actuates lever 73 to rotate shaft 55 clockwise as seen in FIGS. 6a–6c. The shaft 55 has an offset lever arm 59 pivotably coupled at 61 to a linkage 63. A pin 65 near the end of linkage 63 engages a slot in lever 49. With continued rotation, pin 65 migrates within the slot and pin 53 similarly migrates within a slot near the other end of lever 47 as seen in FIG. 6b. Continued clockwise rotation leads to the narrow field of view position of FIG. 6c. The transition from the FIG. 6a position to that of FIG. 6b compresses the coil spring 57 while the transition from the FIG. 6b position to that of FIG. 6c is aided by the coil spring 57. Thus, the control handle or lever 73 acts much like a toggle switch when flipping between the different fields of view and once the FIG. 6b position is reached, the shaft is urged toward the FIG. 6c position.

The sense of the threaded interengagement between stop 37 and shaft 33, and between stop 39 and shaft 33, are opposite. For example, stop 37 may be provided with a left hand internal thread while stop 39 has a right hand internal thread. Rotation of knob 31 in a clockwise sense as viewed in FIG. 1 will move stop 39 toward to the left in FIG. 2 causing lever 49 to pivot about pin 51 in a clockwise sense. Shaft 55 rotates because block 47 rotates shaft 55. Shaft 55 rotates counterclockwise and the variator lenses 19 and 21 to move upwardly and change the wide field of view focus from close toward more distant. Rotation of knob 31 in a clockwise sense as viewed in FIG. 1 will move stop 37 toward to the right in FIGS. 4 and 5 causing the variator lenses 19 and 21 to move downwardly and change the narrow field of view focus from close toward more distant. Thus, in either setting, clockwise knob rotation corresponds to changing from close to more distant focus and counterclockwise knob rotation corresponds to changing from more distant toward a closer focus.

In summary, the invention has a number of advantages over known prior variable field of view focus techniques.

The same set of lenses are moved to accomplish changes in magnification and changes in focus. Focus changes are in the same sense or direction regardless of the field of view setting. That is, the rotational sense in which knob 31 is moved to change focus from, for example, a nearby object to a more distant object is the same regardless of the particular magnification mode in which the device is operating. When a focus distance is set in one magnification mode and the device changed to the other magnification setting, the first focus distance is retained so that the device returns to the focus distance set upon returning to the first magnification mode. Selected focus distances are retained for each magnification mode despite changes in magnification mode because the stops 37 or 39 rotate with the shaft 33, thereby maintaining their axial locations, when not engaged by roller 45.

What is claimed is:

1. A variable magnification, variable focus optical device of the type having a plurality of optical elements disposed along a primary optical axis of the device, the optical elements including at least one optical element movable along the axis between at least two distinct regions, a first region corresponding to a higher optical device magnification mode and a second region corresponding to a lower optical device magnification mode, and said at least one optical element movable along the axis within each of the two distinct regions to vary the focus of the device within the corresponding magnification mode, the improvement comprising:

first operator actuatable means for moving said at least one optical element between said first and second regions to change selectively from one magnification mode to another; and second operator actuatable means for varying axial positioning of said at least one optical element within each said region to focus the optical device in each magnification mode, said second operator actuatable means being movable in one sense to change the focus from a nearby object to a more distant object in either of said regions and in the opposite sense to change the focus from a remote object to a closer object in either of said regions.

2. The improvement of claim 1, wherein the second operator actuatable means includes a control knob and a threaded shaft coupled to the control knob, the threaded shaft having a right hand thread along a portion of the length thereof and a left hand thread along another portion of the length thereof.

3. The improvement of claim 1, wherein the second operator actuatable means includes a control knob and a threaded shaft coupled to the control knob, the improvement further comprising a pair of stop members engaging threadedly the threaded shaft, and means for converting axial motion of a stop member along the threaded shaft to incremental movement of the at least one optical element along the primary optical axis, the threaded shaft having a right hand thread along a portion of the length thereof engaging threadedly one stop member and a left hand thread along another portion of the length thereof engaging threadedly the other stop member.

4. The improvement of claim 3, wherein the means for converting engages selectively one but not the other stop member to prevent rotation of the engaged stop member with threaded shaft rotation, whereby threaded shaft rotation induces migration of the engaged stop member along the axis of the threaded shaft while the other stop member maintains a fixed threaded shaft axial location despite threaded shaft rotation.

5. The improvement of claim 1 wherein the first and second operator actuatable means share:

a common sleeve supporting the at least one movable optical element and axially slidable along the primary optical axis;

a common control shaft journalled for limited rotation about a control shaft axis; a common support block fixed to and rotatable with the control shaft; and a common connecting rod slidably supported by the support block and pivotably engaging the sleeve, whereby common control shaft rotation causes sleeve motion along the primary optical axis.

6. The improvement of claim 5, wherein the first operator actuatable means includes an operator accessible control lever coupled to the control shaft to allow direct operator rotation of the control shaft and gross movement of the sleeve.

7. The improvement of claim 6, wherein the second operator actuatable means includes a control knob, a threaded shaft coupled to the control knob and operator rotatable about a threaded shaft axis, a pair of stop members engaging threadedly the threaded shaft, and means for converting axial motion of a stop member along the threaded shaft to rotational movement of the control shaft about the control shaft axis, the threaded shaft having a right hand thread along a portion of the length thereof engaging threadedly one stop member and a left hand thread along another portion of the length thereof engaging threadedly the other stop member.

8. The improvement of claim 7, wherein the means for converting engages selectively one but not the other stop member to prevent rotation of the engaged stop member with shaft rotation, whereby threaded shaft rotation induces migration of the engaged stop member along the threaded shaft axis while the other stop member maintains a fixed threaded shaft axial location despite threaded shaft rotation.

9. A variable field of view, variable focus optical device of the type having a plurality of optical elements disposed along a primary optical axis of the device, the optical elements including at least one optical element grossly movable along the axis between at least two distinct regions, a first region corresponding to a narrow field of view mode and a second region corresponding to a wider field of view mode, and said at least one optical element movable incrementally along the axis within each of the two distinct regions to vary the focus of the device within the corresponding field of view mode, the improvement comprising:

first operator actuatable means for moving grossly said at least one optical element between said first and second regions to change selectively from one field of view mode to another;

second operator actuatable means for varying incrementally the axial position of said at least one optical element within each said region to focus the optical device in each field of view mode; and the first and second operator actuatable means sharing a common sleeve supporting the at least one movable optical element and axially slidable along the primary optical axis, a common control shaft journalled for limited rotation about a control shaft axis, a common support block fixed to and rotatable with the control shaft, and a common connecting rod slidably supported by the support block and pivotably engaging the sleeve, whereby common control shaft rotation causes sleeve motion along the primary optical axis.

10. The improvement of claim 9, wherein the first operator actuable means includes an operator accessible control lever coupled to the control shaft to allow direct operator rotation of the control shaft and gross movement of the sleeve.

11. The improvement of claim 10, wherein the second operator actuatable means includes a control knob, a threaded shaft coupled to the control knob and operator rotatable about a threaded shaft axis, a pair of stop members engaging threadedly the threaded shaft, and means for converting axial motion of a stop member along the threaded shaft to rotational movement of the control shaft about the control shaft axis, the threaded shaft having a right hand thread along a portion of the length thereof engaging threadedly one stop member and a left hand thread along another portion of the length thereof engaging threadedly the other stop member.

12. The improvement of claim 11, wherein the means for converting engages selectively one but not the other stop member to prevent rotation of the engaged stop member with shaft rotation, whereby threaded shaft rotation induces migration of the engaged stop member along the threaded shaft axis while the other stop member maintains a fixed threaded shaft axial location despite threaded shaft rotation.

13. A variable field of view, variable focus optical device of the type having a plurality of optical elements disposed along a primary optical axis of the device, the optical elements including at least one optical element grossly movable along the axis between at least two distinct regions, a first region corresponding to a narrow field of view mode and a second region corresponding to a wider field of view mode, and said at least one optical element movable incrementally along the axis within each of the two distinct regions to vary the focus of the device within the corresponding field of view mode, the improvement comprising:

first operator actuatable means for moving grossly said at least one optical element between said first and second regions to change selectively from one field of view mode to another; and second operator actuatable means for varying incrementally the axial position of said at least one optical element within each of said regions to focus the optical device in each field of view mode, the second operator actuatable means including a control knob, a threaded shaft coupled to the control knob, a pair of stop members engaging threadedly the threaded shaft, and means for converting axial motion of a stop member along the threaded shaft to incremental movement of the at least one optical element along the primary optical axis, the threaded shaft having a right hand thread along a portion of the length thereof engaging threadedly one stop member and a left hand thread along another portion of the length thereof engaging threadedly the other stop member.

14. The improvement of claim 13, wherein the means for converting engages selectively one but not the other stop member preventing rotation of the engaged stop member with shaft rotation, whereby threaded shaft rotation induces migration of the engaged stop member along the threaded shaft axis while the other stop member maintains a fixed threaded shaft axial location despite threaded shaft rotation.

* * * * *